United States Patent [19]

Oka

[11] 4,071,642
[45] Jan. 31, 1978

[54] METHOD OF REINFORCING POROUS MATERIALS

[75] Inventor: Katsuhiko Oka, Osaka, Japan

[73] Assignee: Asahi Fancy Plywood Co., Ltd., Osaka, Japan

[21] Appl. No.: 707,940

[22] Filed: July 23, 1976

[30] Foreign Application Priority Data

Aug. 1, 1975 Japan .................................. 50-94474

[51] Int. Cl.² .......................... B05D 3/02; B05D 7/00; C23C 13/00

[52] U.S. Cl. ............................... 427/243; 427/248 H; 427/254; 427/255; 427/379; 427/385 A; 427/385 C

[58] Field of Search .................... 118/50, 50.1, 58, 64, 118/48–49; 427/243–247, 373, 377, 379, 381, 382, 385, 390, 248–252; 21/7; 264/137; 162/184, 135, 136

[56] References Cited

U.S. PATENT DOCUMENTS

| | | | |
|---|---|---|---|
| 2,585,539 | 2/1952 | Danly et al. ........................... | 264/137 |
| 2,688,774 | 9/1954 | Malinowski et al. ................. | 264/137 |
| 3,090,700 | 5/1963 | Ball et al. ........................... | 264/137 X |
| 3,759,217 | 9/1973 | Wiegmann ............................... | 118/5 |
| 3,926,717 | 12/1975 | Marchessault et al. ......... | 162/184 X |

Primary Examiner—Morris Kaplan
Attorney, Agent, or Firm—Mason, Fenwick & Lawrence

[57] ABSTRACT

A board-like porous material is coated with a polymerizable monomer over its upper and lower surfaces and is thereby immediately impregnated with the monomer. The material is then placed into shallow containers. A specified number of the containers containing the material are stacked, a lid is placed over the uppermost container, and the containers are hermetically closed by being held together by fastening means. The bottom wall of the container and the lid are each of a hollow structure and include a plurality of parallel partitions providing hot air passages arranged in parallel and having open front and rear ends. Finally, hot air is supplied to the passages to heat the containers, whereby the polymerizable monomer impregnating the material is vaporized, diffused through the material and then polymerized without application of pressure to the coated porous material.

8 Claims, 5 Drawing Figures

METHOD OF REINFORCING POROUS MATERIALS

BACKGROUND OF THE INVENTION

This invention relates to a method of reinforcing porous materials.

Porous materials including inorganic fiber boards such as rock wool boards and asbestos boards and organic fiber boards such as insulation boards are lightweight and convenient to handle because of low specific gravity, inexpensive to manufacture and excellent in heat insulating properties and soundproofing properties. Although suitable for use as construction materials in these respects, they have yet to be improved in strength. Accordingly attempts have heretofore been made to impart increased strength to such porous materials. In making rock wool fiber boards by a wet method, for example, it is known to admix plaster of Paris with a slurry starting material, but the resulting product, which has increased hardness, is still low in bending strength and internal cohesive force. It has also been attempted to admix corn starch with the slurry starting material. This method fails to give products which are satisfactory in bending strength, internal cohesive force and hardness. Another method is also known in which pulp is admixed with the slurry starting material. Although the method ensures effective entanglement of the fibers, thereby affording somewhat increased bending strength and greater internal cohesive force, the product still remains to be improved.

SUMMARY OF THE INVENTION

The present invention provides a method of imparting satisfactory strength to porous materials. The method comprises the steps of coating the desired surface of a porous material with a polymerizable substance, placing the porous material with a polymerizable substance, placing the porous material into a container after the material has been impregnated with the polymerizable substance by the coating, hermetically closing the container and heating the closed container to diffuse at least part of the polymerizable substance through the porous material upon vaporization and to subsequently polymerize the polymerizable substance, whereby the porous material is fully reinforced and given excellent properties for use as a construction material, especially as a wall material.

This invention will be described below in greater detail with reference to the accompanying drawings.

DETAILED DESCRIPTION OF THE INVENTION

Figure 1:
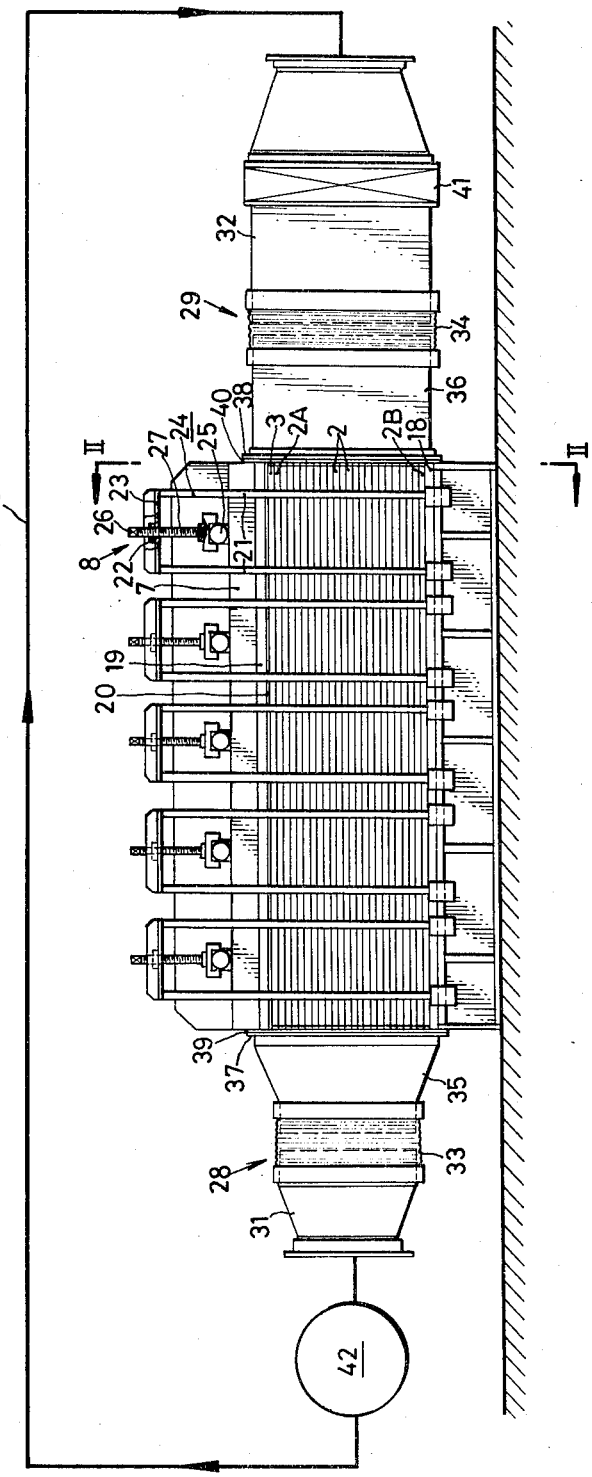
FIG. 1 is a side elevation of a heating apparatus for practicing the method of reinforcing porous materials according to this invention.
Figure 2:
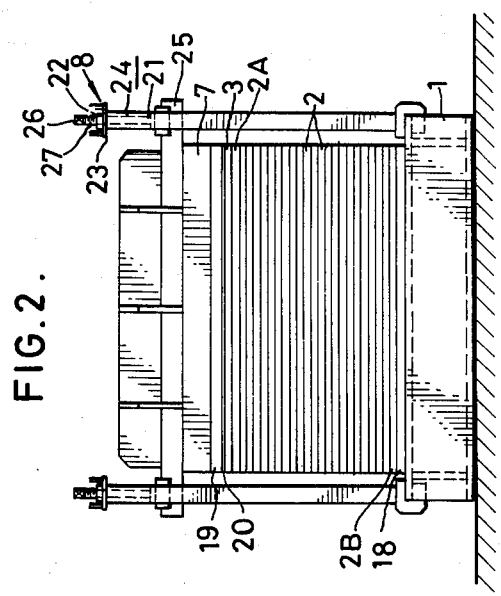
FIG. 2 is a view in section taken along the line II—II in FIG. 1.

Throughout the specification and claims, the term "front" refers to the direction in which hot air flows, i.e., the left-hand side of FIG. 1, and the term "rear" refers to the opposite direction.

With reference to the drawings, the apparatus to practice the method of the invention mainly comprises a base 1, a number of shallow containers 2 stacked on the base 1 for containing a board-like porous material P impregnated with a polymerizable substance, a lid 3 for covering the uppermost container 2A and fastening means 8 for keeping the containers 2 hermetically closed. The bottom wall 9 of the container 2 and the lid 3 each have a hollow structure and include a plurality of parallel partitions 10, 11 which define a plurality of hot air passages 12, 13 arranged in parallel and having open front and rear ends.

By the porous material is meant a material having minute spaces or clearances extending therethrough and permitting the polymerizable substance to diffuse through the interior of the material upon being vaporized by heating and to polymerize. Examples of such porous materials are those consisting predominantly of inorganic fiber materials such as rock wool, asbestos, glass fiber, etc.; those consisting predominantly of lightweight inorganic materials such as perlite, vermiculite, etc.; those prepared by adding plaster of Paris, lime, clay or like filler to at least one of such inorganic fiber materials and lightweight inorganic materials; organic products such as insulation board, felt, cardboard, etc.; and materials prepared by binding crushed waste synthetic resin into a solid body with slight clearances or spaces formed in its interior. Preferably the porous materials have a specific gravity of 0.2 to 1.0. If the specific gravity is less than 0.2, the material has insufficient strength, whereas if it is over 1.0, the porous material will not have the above-mentioned excellent properties inherent thereto.

The useful polymerizable substances include polymerizable monomers, mixtures of a polymerizable monomer and a prepolymer, mixtures of a polymerizable monomer and an oligomer and mixtures of a polymerizable monomer, a prepolymer and an oligomer. Among these, polymerizable monomers are suitable which can be readily vaporized and which are polymerizable with a radical polymerization catalyst. More specific examples are vinyl monomers such as methyl methacrylate, styrene, vinyl acetate, etc., divinyl monomers such as ethylene gycol dimethacrylate, etc., multi-functional monomers such as trimethylolpropane trimethacrylate, glycerin trimethacrylate, etc.

The radical polymerization catalyst is added to the polymerizable monomer prior to the application of the monomer. Examples of the catalysts are organic peroxides such as benzoyl peroxide, t-butyl perbenzoate, lauroyl peroxide, etc. and azo compounds such as azobisisobutyronitrile, 2,2'-azobis-(2,4-dimethylvaleronitrile), etc. The catalyst is used in an amount of 0.1 to 5% by weight based on the polymerizable monomer. The polymerization temperature and polymerization time are suitably determined depending on the kinds and amounts of the polymerizable monomer and polymerization catalyst. To cause the polymerization reaction to proceed promptly, it is desirable to use the polymerization catalyst conjointly with a polymerization accelerating agent. Examples of polymerization accelerating agents are aliphatic amines, aromatic amines, metal salts, benzoin, etc. The strength of the product can be increased to a greater extent by adding to the polymerizable monomer a cross-linking agent such as divinylbenzene, diallyl phthalate or the like.

Figure 3:
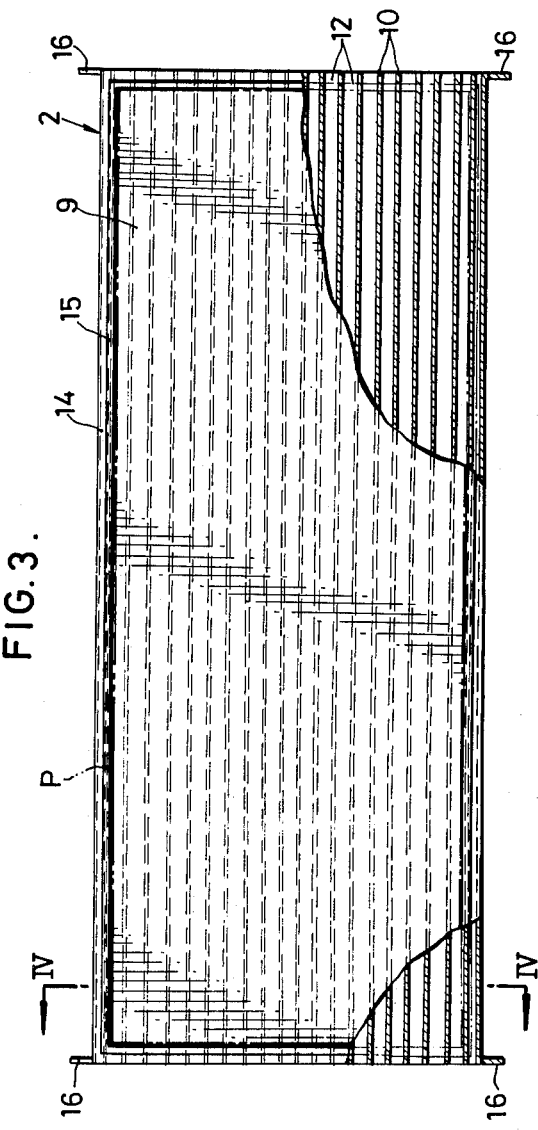
FIG. 3 is an enlarged plan view partly broken away and showing a container.
Figure 4:
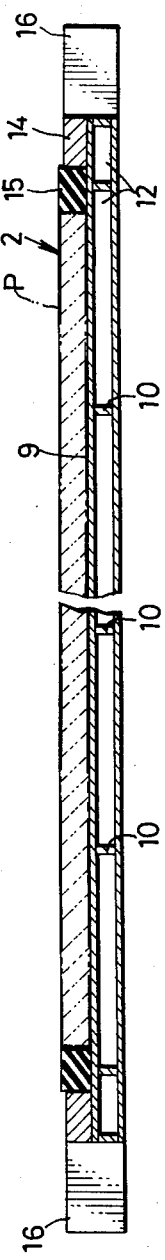
FIG. 4 is an enlarged view in section taken along the line IV—IV in FIG. 3.
Figure 5:
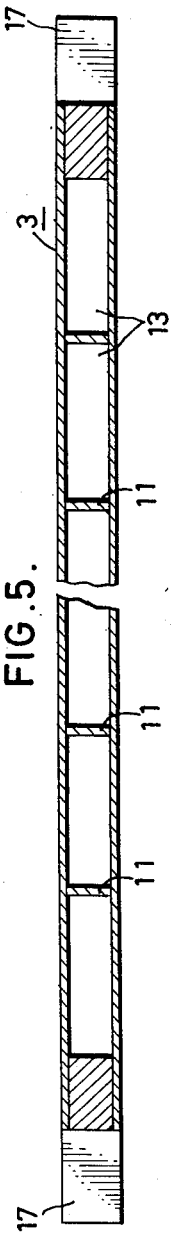
FIG. 5 is a sectional view corresponding to FIG. 4 and showing a lid.

The container 2 and the lid 3, which are made of iron, are rectangular. The peripheral wall 14 of the container 2 has an increased thickness. Inside the peripheral wall 14, there is provided a thick rubber packing 15 intimately fitted to the wall 14 and slightly projecting thereabove. The rubber packing 15 has a rectangular cross section and is in the form of a picture frame when seen in a plan view. The container 2 including the packing 15 has a capacity which is approximately equal to the volume of the board-like porous material P. The lid 3 has about twice the thickness of the bottom wall 9 of the container 2. Since polymerization reaction heat is generated during heating, the container having amother container placed thereover receives the reaction heat from above, whereas the uppermost container 2A does not receive such heat from above. In order to compensate for the difference in the amount of the heat, the thickness of the lid 3 is made greater, and the hot air passage 13 is thereby made greater than the passage 12 of the bottom wall 9 in cross sectional areas. As shown in FIGS. 3 to 5, the container 2 and the lid 3 are provided, at their front and rear ends, with outwardly projecting flanges 16, 17 respectively. A heat insulating plate 18 is interposed between the lowermost container 28 and the base 1. Provided between the uppermost container 2A and a holding plate 7 are a thick heat insulating plate 19 and a thin heat insulating plate 20 disposed beneath the plate 19.

The fastening means 8 comprises frames 24 removably mounted on the opposite sides of the base 1 in upright position and each including two posts 21 and a top plate 23 extending between, and secured to, the upper ends of the posts 21 and having an internally threaded portion 22 at the middle of its length; rod members 25 secured to the top surface of the holding plate 7 and each extending transversely for each opposed pair of the frames 24, each of the rod members 25 having opposite ends extending below a pair of the internally threaded portions 22 on the opposite sides; and screw rods 27 rotatably mounted on the opposite ends of the rod members 25 respectively and upwardly extending through the internally threaded portions 22 in screw-thread engagement therewith, each of the screw rods 27 having at its upper end a fitting portion 26 for a fastening handle. A heat insulating plate (not shown) may preferably be provided between each row of frames 24 and each side of the stacked containers 2 and the lid 3.

The open rear ends of the hot air passages 12, 13 in the bottom walls 9 of the stacked containers 2 and the lid 3 serve as hot air inlets, and the open front ends of the same as hot air outlets. Front and rear horizontal ducts 28, 29 are so disposed as to communicate with all the outlets and all the inlets of the hot air passages 12, 13. The ducts 28, 29 respectively comprise fixed portions 31, 32 both connected to a circulation duct 30, and movable portions 35, 36 connected to the fixed portions 31, 32 by means of collapsible joints 33, 34. The movable portions 35, 36 are provided, at their open ends, with flanges 37, 38 in the form of a picture frame. The flanges 37, 38 bear against the holding plate 7 at their upper portions, against the base 1 at their lower portions, and against the opposite ends of the heat insulating plates 18, 19, 20 and flanges 16, 17 of the containers 2 and the lid 3 at their side portions, with similarly shaped packings 39, 40 interposed therebetween. The flanges 37, 38 are detachably secured to the holding plate 7 and the base 1 by bolts and nuts or the like. The fixed portion 32 of the rear horizontal duct 29 is provided with a steam heater 41 therein, by which the air sent into the duct 29 from the circulation duct 30 is heated and then supplied to all the passages 12, 13. At a position close to the front horizontal duct 28, the circulation duct 30 is provided with a blower 42, by which the hot air flowing out from the outlets of the passages 12, 13 is forced to circulate through the air path.

The board-like porous material is coated and impregnated with the polymerizable substance which is sprayed from nozzles onto the material while the material is being sent to the heating apparatus on a plurality of conveyors (not shown). The spray nozzles are directed downward and upward from above and below a location between front and rear conveyors and disposed in staggered arrangement. Instead of using the spray nozzles, the porous material may be coated with the polymerizable substance by a flow coater, roll coater or brush. Depending on the case, the porous material may be immersed in a liquid polymerizable substance. The amount of the polymerizable substance to be applied to the porous material is preferably 2 to 50% by weight, more preferably 10 to 20% by weight, based on the weight of the material.

The porous material which has been impregnated with the polymerizable substance is covered with cellophane paper over its upper and lower surfaces before being placed into the container 2, whereby the material is prevented from adhering to the bottom wall 9 of the container 2 and the lid 3 due to heating. Accordingly a release film or sheet other than cellophane paper is usable, or the upper surface of the bottom wall 9 and the lower surface of the lid 3 may be subjected to release treatment.

The porous material P covered with cellophane paper as above is placed into the containers 2 to be stacked. As seen in FIG. 4, the porous material P has a thickness approximately equal to the height of the packing 15. When the screw rods 27 of the fastening means 8 are driven downward, causing the holding plate 7 to hold the stacked containers 2 and lid 3, the porous material P in each of the containers is compressed, along with the packing 15, to the top surface of the peripheral wall 14, whereby the containers 2 are maintained in a hermetically sealed state, serving as sealed containers.

While the porous material P is being placed into a specified number of containers 2, the heating apparatus is held in operation with hot air supplied to the passages 12 in the bottom walls 9 of the containers 2 and the passages 13 in the lid 3. The rate of flow of hot air through the passages 12, 13 is suitably 15 to 20 m/min. When it is desired that the polymerizable substance applied to the porous material P be vaporized approximately 100% by heating, the polymerizable substance is first maintained at a temperature above the polymerization temperature of the substance for a predetermined period of time, the valve of the steam heater 41 is then adjusted to reduce the temperature to the polymerization temperature and the substance is maintained at this temperature for a predetermined period of time. When heated in this manner, the polymerizable substance is diffused through the porous material P substantially uniformly. If it is desired to form layers of a higher polymer content on the upper and lower surfaces of the porous material without permitting the polymerizable substance to diffuse to the midportion of the thickness of the porous material in order to impart greater strength to the upper and lower surfaces, the substance is heated at the polymerization temperature and is thereby vaporized 40 to 80%, with the result that part of the substance remains unvaporized on the upper and lower surfaces of the porous material. The containers 2, which are held hermetically sealed during heating, prevent escape of the vaporized polymerizable substance from the containers, permitting the vapor to efficiently diffuse through the porous material P. Since both the bottom walls 9 of the containers 2 and the lid 3 are of a hollow construction and include a plurality of parallel partitions 10, 11, providing open-ended, parallel, hot air passages 12, 13, the bottom walls 9 and the lid 3 also function as heating plates, thus eliminating the necessity of using other heating elements. The hot air passages 12, 13, which are disposed in parallel arrangement, enable the hot air to uniformly flow straight throughout the hollow portions of the bottom walls 9 and the lid 3, eliminating irregularities in temperature and thereby obviating the possibility that the polymerizable substance might remain partially unpolymerized within the porous material P or the possibility of uneven polymerization taking place. The parallel partitions 10, 11 in the bottom walls 9 and lid 3, which define straight hot air passages 12, 13, also serve to reinforce the hollow bottom walls 9 and lid 3. Use of air as the heat medium assures trouble-free connection and separation between the hot air passages 12, 13 and the horizontal ducts 28, 29 and keeps the parts free of staining which would occur if a liquid is used. When the polymerizable substance diffused through the porous material P has been completely polymerized, the heater 41 and blower 42 are stopped, the horizontal ducts 28, 29 removed from the holding plate and base 1, and the movable portions 35, 36 drawn toward the fixed portion 31, 32. The frames 24 are removed from the opposite sides of the base 1, the holding plate 7 and the containers 2 including the lowermost container 2B are removed sidewise from the base 1, the lid 3 opened, and the reinforced porous material taken out from the containers 2. The containers 2 and the lid 3 are completely cooled before being subsequently installed into the heating apparatus.

Although an embodiment has been described above in which the board-like porous material P is coated with the polymerizable substance over both the upper and lower surfaces thereof, the substance may be applied only to one surface. The porous materials to be reinforced are generally in the shape of a board, because they are used as wall or like construction materials. However, they are not limited to this shape but may be in the shape of a square rod, cylinder, etc.

EXAMPLE 1

A commercial rock wool board, 909 mm in width, 1,818 mm in length, 9 mm in thickness, was coated over its opposite surfaces with 10% by weight of methyl methacrylate monomer (containing 1% by weight of benzoyl peroxide based on the monomer) based on the weight of the board. The coated board was maintained at 110° C for 10 minutes and then at 80° C for 6 hours on the heating apparatus described above, causing the methyl methacrylate monomer to vaporize and diffuse through the rock wool board and to thereafter polymerize. For comparison, Table 1 shows the properties of the product thus obtained and those of the rock wool board material before the treatment.

Table 1

|  | Material | Product |
| --- | --- | --- |
| Bulk density | 0.36 | 0.39 |
| Bending strength (kg/cm$^2$) | 25 | 55 |
| Internal cohesive force (kg/cm$^2$) | 0.7 | 1.2 |
| Dimensional change (%) | 0.3 | 0.1 |
| Yield of polymer (%) | — | 90 |

EXAMPLE 2

A board-like porous material composed of 10% of rock wool, 55% of glass, 30% of plaster of Paris and 5% of starch and having the same size as the board used in Example 1 was coated over its opposite surfaces with 10% by weight of methyl methacrylate monomer (containing 1% by weight of azobisisobutyronitrile based on the monomer) based on the weight of the material. The coated material was maintained at 120° C for 10 minutes and then at 90° C for 4 hours on the same heating apparatus as above, causing the methyl methacrylate monomer to vaporize and diffuse through the porous material and to thereafter polymerize, whereby a reinforced product was obtained.

EXAMPLE 3

The same board-like porous material as used in Example 2 was coated over its opposite surfaces with 10% by weight of methyl methacrylate monomer (containing 0.5% by weight of benzoyl peroxide based on the monomer) based on the weight of the material. The coated material was maintained at 110° C for 15 minutes and then at 90° C for 4 hours on the same heating apparatus as above, causing the methyl methacrylate monomer to vaporize and diffuse through the porous material and to thereafter polymerize, whereby a reinforced product was obtained.

EXAMPLE 4

A product was obtained under exactly the same conditions as in Example 3 except that the coated material was not heated at two different temperature levels but was maintained at 85° C for 6 hours.

EXAMPLE 5

The same board-like porous material as used in Example 2 was coated over its opposite surfaces with 12% by weight of a composition based on the weight of the material, the composition comprising 70 parts by weight of methyl methacrylate monomer, 30 parts by weight of methyl methacrylate prepolymer (viscosity: 3 poises) and 0.5 part of weight of azobisisobutyronitrile. The coated material was maintained at 100° C for 15 minutes and then at 90° C for 4 hours on the same heating apparatus as above, causing the composition to vaporize and diffuse through the porous material and to thereafter polymerize, whereby a reinforced product was obtained.

EXAMPLE 6

The same board-like porous material as used in Example 2 was coated over its opposite surfaces with 13% by weight of styrene monomer (containing 0.5% by weight of azobisisobutyronitrile based on the monomer) based on the weight of the board. The coated material was maintained at 140° C for 15 minutes and then 130° C for 4 hours and 20 minutes on the same heating apparatus as above, causing the styrene monomer to vaporize and diffuse through the porous material and to thereafter polymerize, whereby a reinforced product was obtained.

For comparison, Table 2 shows the properties of the products obtained in Examples 2 to 6 and those of the material before the treatment.

Table 2

|  | Material | Product | | | | |
|---|---|---|---|---|---|---|
|  |  | Example 2 | Example 3 | Example 4 | Example 5 | Example 6 |
| Bulk density | 0.45 | 0.49 | 0.55 | 0.55 | 0.56 | 0.54 |
| Bending strength (kg/cm$^2$) | 15 | 60 | 68 | 70 | 82 | 60 |
| Internal cohesive force (kg/cm$^2$) | 0.3 | 2.1 | 2.4 | 2.0 | 1.3 | 0.8 |
| Dimensional change (%) | Collapsed | 0.10 | 0.09 | 0.10 | 0.10 | 0.10 |
| Yield of polymer (%) | — | 88.5 | 90 | 90 | 92.5 | 88.5 |

EXAMPLE 7

A commercial insulation board, 909 mm in width, 1,818 mm in length, 12 mm in thickness, was coated over its opposite surfaces with 10% by weight of methyl methacrylate monomer (containing 0.5% by weight of azobisisobutyronitrile based on the monomer) based on the weight of the board. The coated board was maintained at 110° C for 10 minutes and then at 25° C for 5 hours on the heating apparatus described above, causing the methyl methacrylate monomer to vaporize and diffuse through the board and to thereafter polymerize. For comparison, Table 3 shows the properties of the product thus obtained and those of the insulation board material before the treatment.

Table 3

|  | Material | Product |
|---|---|---|
| Bulk density | 0.34 | 0.37 |
| Bending strength (kg/cm$^2$) | 25 | 38 |
| Internal cohesive force (kg/cm$^2$) | 0.8 | 1.4 |
| Change in weight due to water absorption(%) | 15 | 7 |
| Yield of polymer (%) | — | 88.5 |

This invention may be embodied differently without departing from the spirit and basic features of the invention. Accordingly the embodiments herein disclosed are given for illustrative purposes only and are not in any way limitative. It is to be understood that the scope of this invention is defined by the appended claims rather than by the specification and what various alterations and modifications within the definition and scope of the claims are included in the claims.

What is claimed is:

1. A method of reinforcing a porous material comprising coating a desired surface of a porous material having a specific gravity of 0.2 to 1.0 with 2 to 50% by weight of a polymerizable substance based on the weight of the porous material, placing the coated porous material into a container having a capacity approximately equal to the volume of the coated material, hermetically sealing the container, and without the application of pressure heating the closed container to diffuse at least part of the polymerizable substance through the porous material upon vaporization and to subsequently polymerize the polymerizable substance.

2. The method as defined in claim 1 wherein the porous material has a board-like shape and is coated with the polymerizable substance over the surfaces thereof.

3. The method as defined in claim 1 wherein the polymerizable substance is entirely vaporized.

4. The method as defined in claim 1 wherein the polymerizable substance is vaporized approximately 40 to 80%.

5. The method as defined in claim 1 wherein the heating is effected first at a temperature above the polymerization temperature and subsequently at the polymerization temperature.

6. The method as defined in claim 1 wherein the polymerizable substance is one menber selected from the group consisting of polymerizable monomers, mixtures of a polymerizable monomer and a prepolymer, mixtures of a polymerizable monomer and an obligomer and mixtures of a polymerizable monomer, a prepolymer and an oligomer.

7. The method as defined in claim 6 wherein the polymerizable monomer is a monomer selected from the group consisting of vinyl monomers, divinyl monomers and multi-functional monomers.

8. A method of reinforcing a board like porous material having a specific gravity of 0.2 to 1.0 comprising the steps of coating the upper and lower surfaces of the board-like porous material with 2 to 50% by weight of a polymerizable substance based on the weight of the porous material, placing the coated porous material in containers having a capacity approximately equal to the volume of the porous material after the material has been coated with the prepolymerizable substance, hermetically sealing the containers after a specified number of containers have been interconnected, flowing hot air through passageways formed in the wall structure of the closed containers, thereby diffusing at least a portion of the polymerizable substance through the porous material by vaporization and subsequently polymerizing the polymerizable substance without subjecting the coated porous material to pressure.

* * * * *